United States Patent [19]
Takeshita et al.

[11] Patent Number: 5,986,980
[45] Date of Patent: Nov. 16, 1999

[54] OPTICAL DISC DEVICE CAPABLE OF RECORDING INFORMATION DATA AS A PLURALITY OF LINKING PACKETS

[75] Inventors: Kenichiro Takeshita; Morihiro Murata, both of Hamamatsu, Japan

[73] Assignee: Yamaha Corporation, Hamamatsu, Japan

[21] Appl. No.: 08/968,174

[22] Filed: Nov. 12, 1997

[30] Foreign Application Priority Data

Nov. 15, 1996 [JP] Japan ................................ 8-305129

[51] Int. Cl.$^6$ ................................................ G11B 17/22
[52] U.S. Cl. ............................................................ 369/32
[58] Field of Search ............................... 369/32, 58, 54, 369/275.3, 47, 48, 275.2, 33

[56] References Cited

U.S. PATENT DOCUMENTS

5,426,629  6/1995  Saitou et al. ............................ 369/99
5,559,778  9/1996  Inokuchi et al. ........................ 369/58
5,721,856  2/1998  Takeuchi .................................. 369/32
5,745,459  4/1998  Inokuchi et al. ........................ 369/58

*Primary Examiner*—Tan Dinh
*Attorney, Agent, or Firm*—Pillsbury Madison & Sutro LLP

[57] ABSTRACT

Data buffer stores therein data of a plurality of packets supplied from an optional external source on a packet-by-packet basis. When a predetermined quantity of data have been stored in the data buffer, a system controller successively reads out from the data buffer the data for N (an optional integral number of two or more) packets from among the supplied packets. Encoder converts, into a recording format of an optical disc, the data for the N packets successively read out from the data buffer and outputs the converted data after adding thereto packet-linking information. Then, the converted data for the N packets with the packet-linking information are successively recorded onto the optical disc. Thus, even for long data of a plurality of packets, this arrangement can reduce a necessary number of track seek operations to thereby greatly reduce a necessary recording time.

7 Claims, 5 Drawing Sheets

OPTICAL DISC DEVICE CAPABLE OF RECORDING INFORMATION DATA AS A PLURALITY OF LINKING PACKETS

BACKGROUND OF THE INVENTION

The present invention relates generally to devices for recording data onto recordable optical discs, such as a CD-R (Compact Disc-Recordable) or DVD (Digital Video Disc-Recordable) where data are recorded on a packet-by-packet basis, and it relates more particularly to a packet-write-type optical disc recording device which records data in packets each having a predetermined data length.

Examples of the conventionally-known methods for recording data on a CD-R include the "disc-at-once" method in which data for a whole optical disc are recorded in succession by single recording operation and the "track-at-once" method in which a plurality of sessions are allowed to be written onto a disc in an additive fashion (additive writing). All of these recording methods, however, involve recording of a great quantity of data per recording operation, consuming a managing memory area of 10 to 20 megabytes per recording operation. Thus, the known recording methods are not suited to applications where a relatively small quantity of data are written a plurality of times in an additive fashion.

In contrast, the so-called "packet-write" recording method, in which a small quantity of data are written onto an optical disc on a packet-by-packet basis, has the advantage that any necessary file can be additively written in much the same way as normally done on conventional hard discs, and hence it has been becoming increasingly popular in applications where a CD-R is used as an external storage device for a computer.

Figure 5:
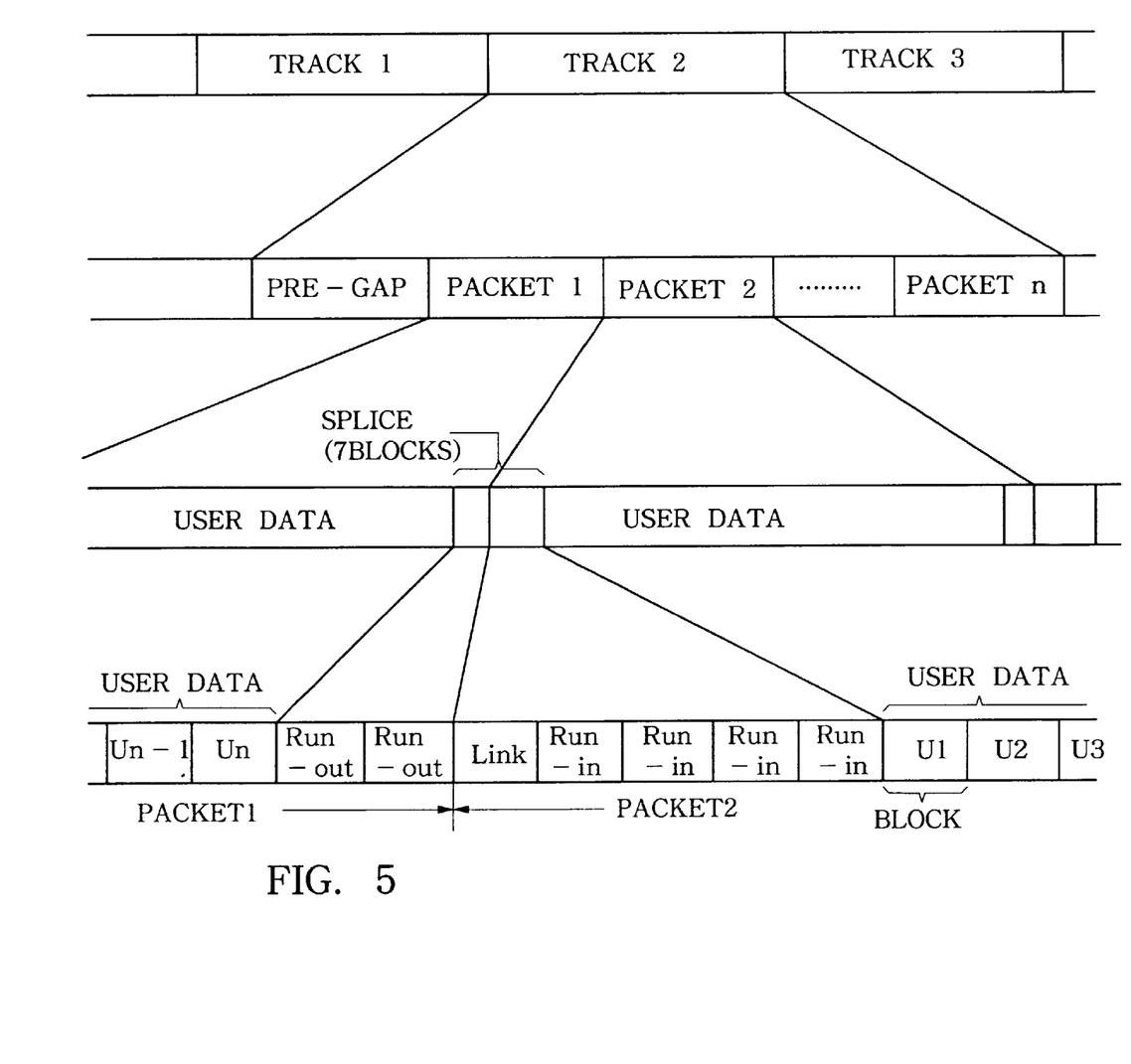
FIG. 5 is a diagram showing a packet-write recording format on a CD-R.

FIG. 5 is a diagram illustrating a packet-write recording format. Each track is composed of a pre-gap, which is a managing area provided at the head of the track, and a plurality of packets following the pre-gap. In this format, data are written on the packet-by-packet basis; that is, each packet is written onto a disc, following an already-written packet. For this purpose, the pre-gap contains track descriptors, and a specific position to record a new packet is determined by reference to position information of a last packet written on the optical disc. In additively writing a new packet, it is impossible to physically link the new packet with the preceding already-written packet in a continuous manner, so that a pratically unreadable block called a "link block" is provided between every adjoining packets. Link information called a "splice" is stored in a data link period between the packets. The splice comprises information stored in a total of seven blocks: run-out information (Run-out) stored in two blocks at the end of a preceding packet; link information (Link) stored in one block at the head of a succeeding packet; and run-in information (Run-in) in four blocks of the succeeding packet.

The packet length is set by an external host computer. Because each packet comprises a plurality of blocks (sectors) each having a length of about 2K bytes, the packet length may be determined using 2K-byte units in principle However, due to the splice consuming a total of 14K bytes, the recording areas can not be used efficiently if the packet length is too short. For this reason, the packet length is normally set to 64K bytes, 128 bytes or the like so that the effective use rate of the recording areas exceeds 80 per cent.

Because of the nature of the packet-by-packet additive writing, the conventional optical disc recording devices conduct data recording onto an optical disc on the packet-by-packet basis. When one packet of data is to be recorded, a series of operations is generally required to store data for one packet from the host computer into an internal data buffer of a disc drive device, move a recording head to a particular writing position facing the disc (seek operation) and then initiate recording of the stored one-packet data by means of the recording head. The reason why the recording is initiated after storage of the one-packet data is that if there ocurs a break or interruption of data during recording, all data having so far been recorded would become errors.

If the size of a file is short enough to fit within a single packet, the above-mentioned recording method would present no significant problem; however, if the file is longer, a problem would arise that the seek operation frequently takes place, making recording of the file time-consuming. In addition, laser power of the recording head is frequently calibrated, which would result in shortage of a calibrating area. Such a problem may be lessened if the packet size is increased, but the increased packet size would considerably deteriorate the advantageous function of the packet-write recording method which allows a small quantity of data to be recorded in an additive fashion.

SUMMARY OF THE INVENTION

Therefore, it is a primary object of the present invention to provide an optical disc recording device which, even for long data of a plurality of packets, can reduce a necessary number of track seek operations to thereby greatly reduce a necessary time for recording the data and also can reduce a necessary number of calibrating operations.

It is another object of the present invention to provide an optical disc recording device which permits high-speed recording without sacrificing the advantage of the packet-write recording method regardless of a size of data to be recorded.

According to a primary aspect of the present invention, there is provided an optical disc recording device which comprises: a data buffer for storing therein data of a plurality of packets supplied from an optional external source on a packet-by-packet basis, each of the packets having a predetermined data length; a control section that when a predetermined quantity of data have been stored in the data buffer, successively reads out from the data buffer the data for N packets from among the supplied packets, N being an optional integral number of two or more; an encoding section that converts, into a recording format of an optical disc, the data for the N packets successively read out from the data buffer and outputs the converted data after adding thereto packet-linking information; and a writing section that successively records, onto the optical disc, the converted data for the N packets outputted from the encoding section.

Once the predetermined quantity of data have been stored in the data buffer having a storage capacity for a plurality of packets, the stored data for the predetermined N packets are sequentially read out to be successively written or recorded onto an optical disk. This characteristic arrangement requires only one seek operation for recording the N-packet data, thereby greatly reducing the necessary recording time and the necessary number of laser power calibration as compared to the conventional technique.

In a preferred implementation, the control section determines a maximum number of packets storable in the data buffer on the basis of a size of the supplied packets from, e.g., a host computer and a storage capacity of the data buffer and sets the determined number of packets as the N packets to be successively read out from the data buffer. This arrangement permits successive recording of as many packets as possible within the available capacity of the data buffer.

In another preferred implementation, when data supply to the data buffer is terminated before the predetermined quantity of data are stored in the data buffer, the control section starts reading out the stored data from the data buffer and ends recording onto the disc after all the stored data are read out and recorded onto the optical disc. That is, if the data supply from the host computer to the data buffer is terminated before the predetermined quantity of data are stored in the data buffer, i.e., before a condition to start the data readout (recording) is satistifed, the control section starts reading out the already-stored data from the data buffer and ends the successive recording onto the disc after all the stored data are read out and recorded onto the optical disc. With such control, even when a short file is to be recorded, the recording operation can be safely initiated and the file can be recorded onto the optical disc with a single recording operation. Thus, desired recording can be done with a minimized number of seek operation, irrespective of a data size.

In still another preferred implementation, if a user enters a recording ending instruction before the predetermined quantity of data are stored in the data buffer, the control section immediately ends the recording without starting readout of the stored data from the data buffer. That is, once the user selects to compulsorily terminate the data supply before the predetermined quantity of data are stored in the data buffer, control is performed to end the recording operation without starting readout of the stored data from the data buffer. Thus, when wrong data are designated for recording, it is possible to prevent the wrong data from being wastefully recorded onto a recording area of the optical disc. In such a case, the wrong data would often be wastefully recorded with the conventional packet-by-packet recording method where the recording operation is intiated promptly. However, the present invention can effectively reduce the possibility of such wrong or unnecessary data being recorded, because the recording operation is not initiated before the predetermined quantity of data are stored in the data buffer.

In still another preferred implementation, the control section starts reading out the data for the N packets from the data buffer when data for at least the N packets have been stored in the data buffer. Because readout of the N-packet data is started upon conformation that the N-packet data have been stored in the data buffer, the successive recording for the N packets is completely guaranteed, so that no error would occur during recording of the N packets.

In still another preferred implementation, the control section inhibits the data supply from the external source at a time point when the data for the Ne packets have been stored in the data buffer (Ne is an optional integral number of two or more), and the control section resumes the data supply from the external source when the stored data in the data buffer have decreased to a predetermined quantity corresponding to Ns packet (Ns is an optional integral number smaller than the number Ne). Such control of data input to the data buffer gurantees that a constant quantity of data be maintained on a packet-by-packet basis and consequently can reduce a time necessary for starting a new recording operation after the successive recording of the N packets.

In yet another preferred implementation, if data for M packet have already been stored in the data buffer as data to be recorded following the N packets before recording of the data for the N packets is completed, the control section sets a specific number of packets to be successively recorded to M (M is an optional integral number of one or more). That is, in the case where data for M packet are present in the data buffer as data to be recorded following the N packets before recording of the data for the N packets is completed, the number of packets to be successively recorded is updated to M, so that the number can be further increased. By repeating such operations, data of one file can be successively recorded, with no undesired interruption, through only one seek operation, depending on the relashionship between the rates of data input to the data buffer and data readout from the data buffer.

BRIEF DESCRIPTION OF THE DRAWINGS

Preferred embodiments of the present invention will now be described with reference to the accompaniment drawings, in which.

DETAILED DESCRIPTION OF THE PREFERRED EMBODIMENTS

Figure 1:
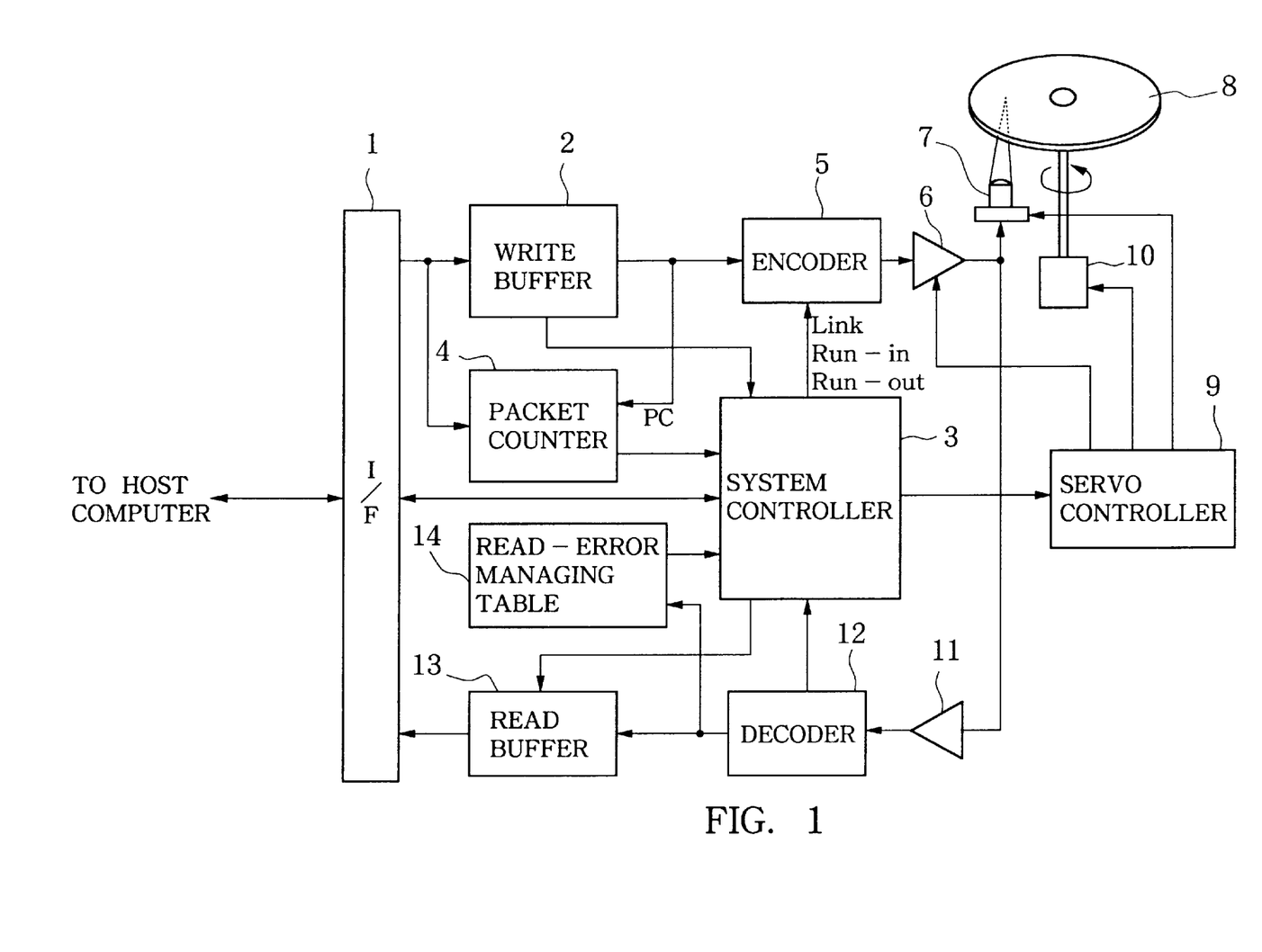
FIG. 1 is a block diagram illustrating a general setup of a CD-R drive device in accordance with a preferred embodiment of the present invention.

FIG. 1 is a block diagram illustrating a general setup of a CD-R (Compact Disc-Recordable) drive device in accordance with a preferred embodiment of the present invention.

Data of a file to be recorded, supplied packet by packet from a host computer, are stored via an interface 1 into a write buffer (data buffer) 2 having a storage capacity for a plurality of packets, and the stored data are read out from the write buffer 2 under the control of a system controller 3. Each of the packets stored in the write buffer 2 includes, at its beginning and end, identifiers indicative of the start and end of the packet. In response to the identifiers, a packet counter 4 increments by one each time one packet is stored into the write buffer 2 and decrements by one each time one packet is read out from the write buffer 2. This way, the packet counter 4 constantly holds the number of packets PC currently stored in the write buffer 2.

The system controller 3 control data input and output to and from the write buffer 2 on the basis of the number of currently-stored packets PC and commands from the host computer. Data read out from the write buffer 2 are fed to an encoder 5, which converts the fed data into a predetermined recording format on the packet-by-packet basis. Specifically, the fed data are imparted ECC (Error Correction Code)/EDC (Error Detection Code) block by block (sector by sector), sector-interleaved as necessary, imparted a splice such as link, run-in and run-out information given from the system controller 3, and EFM (Eight to Fourteen Modulation)-modulated, to thereby provide data to be written (or write data).

The write data output from the encoder 5 are then delivered via an amplifier 6 to an optical head 7, which, using the delivered write data, modulates the power of a laser light beam so as to form pits in an optical disc 8. In accordance with instructions given from the system controller 3, a servo controller 9 controls the laser power amplification by the amplifier 6, the seek operation of the optical head 7 and the revolution of a spindle motor 10 rotating the optical disc 8.

Data read out from the optical disc 8 by means of the optical head 7 are fed via an amplifier 11 to a decoder 12. In the decoder 12, the fed data are EFM-demodulated, de-interleaved as necessary, subjected, block by block, to an error detection/correction operation using the ECC/EDC, and then stored into a read buffer 13. When an error block is read out, the system controller 3, as a rule, invalidates the error block and stops the data reading operation. If the error block is a link block, then the system controller 3 continues the data read into the read buffer 13 and registers in a read-error managing table 14 such data indicating that the read-out block is an error block. In response to a data readout request from the host computer, the data thus stored in the read buffer 13 are read out and supplied to the host computer via the interface 1.

Now, a description will be made about the packet writing in the thus-constructed CD-R drive device with reference to FIGS. 2 and 3, which are flowcharts showing typical behaviour of the system controller 3 during the packet writing in the present embodiment.

Once information of the packet size is received from the host computer, the system controller 3, at step S1, calculates or determines a specific number of packets which it should allow the host computer to supply to the write buffer 2 (hereinafter referred to as the "packet-input-starting number" Ns) and another specific number of packets which it should inhibit the host computer from supplying to the write buffer 2 (hereinafter referred to as the "packet-input-stopping number" Ne), depending on the packet size and the storage capacity of the write buffer 2. The packet-input-starting number Ns is an integer of two or more which represents a near-buffer-full condition and may be determined as follows assuming that the packet size is A and the storage capacity of the write buffer 2 is B:

$$Ne=INT(B/A),$$

where INT is an integer portion of (B/A). No problem arises if the packet-input-starting number Ns is an optional integral number of zero or more. If the packet-input-starting number Ns is too small, continiuity in the data read out from the write buffer 2 would be lost, while if the packet-input-starting number Ns is too great, the necessary number of access between the host computer and the drive device would increase. Thus, the packet-input-starting number Ns in this embodiment is set to an appropriate value in consideration of a good balance between the two extremes.

Then, at step S2, the system controller 3 allows the host computer to supply data to the write buffer 2 so that data input from the host computer to the write buffer 2 is started. Upon start of the data input, the system controller 3 sequentially stores the input data into the write buffer 2 until a predetermined quantity of the data are stored as determined at step S5, while continuously monitoring the number of the currently-stored packets or current count PC of the counter 4 or the read and write addresses in the write buffer 2. The above-noted predetermined quantity of the stored data in this embodiment is chosen to correspond to the packet-input-stopping number Ne, although it may be a quantity representing a buffer-full condition. Thus, it is only necessary for the system controller 3 to monitor each current count PC of the counter 4, and it is also possible to prevent the data supply from the host computer from being undesirably broken or interrupted in the middle of a packet. Once the user selects to input a compulsory end instruction to the host computer or CD-R drive device, the system controller 3 terminates the data input to thereby end the recording operation at step S3. This can avoid wastful data recording.

When the current count PC of the counter 4 reaches the packet-input-stopping number Ne as determined at step S5 or when the data supply from the host computer ends as determined at step S4 before the current count PC of the counter 4 reaches the packet-input-stopping number Ne because the file to be recorded is too small in size, the system controller 3 terminates the data input to the write buffer 2 at step S6, sets a value of the count PC as a specific number of packets to be recorded in succession (hereinafter called the number of to-be-successively-recorded packets N) at step S7 and then starts the recording operation at step S8.

Figure 3:
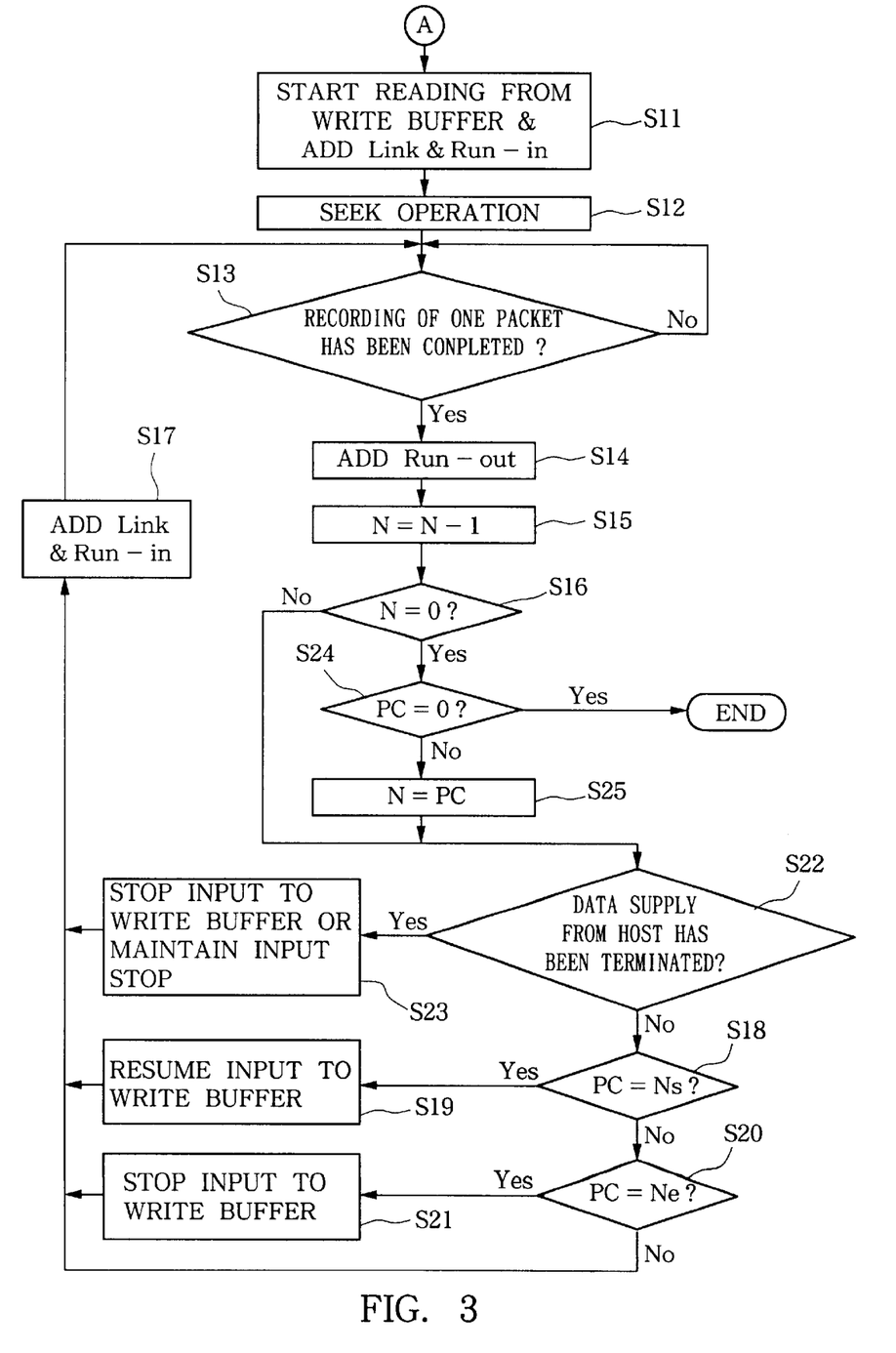
FIG. 3 is a remaining part of the flowchart of FIG. 2.

The recording operation at step S8 is carried out in a manner as shown in FIG. 3. First, at step S11, the system controller 3 starts reading the data from the write buffer 2 and supplies the encoder 5 with link and run-in information. At next step S12, the system controller 3 performs a seek operation, identifies the end position of a last-recorded packet by reference to the track descriptors provided in the pre-gap at the head of the track, allocates a link block to the head of the succeeding packet, adds run-in information to the succeeding packet, and then starts writing the data onto the optical disc 8. Once the recording of one packet is completed as determined at step S13, run-out information is fed to the encoder 5 for addition to the end of the recorded packet at step S14. Thereafter, the number of to-be-successively-recorded packets N is decremented by one at step S15, and the above-mentioned recording operation is repeated in succession for the N packets, i.e., until the number of to-be-successively-recorded packets N decreases to zero (steps S16, S17 and S13 to S15). By such successive recording, the link block, which did not link adjoining packets physically in the traditional packet writing scheme, is formed on the optical disc 8 as a block linking the adjoining packets physically although not logically.

Note that if the file size is greater than the packet-input-stopping number Ne, this means that other data remain in the host computer to be supplied. Thus, once the current count PC of the counter 4 reaches the packet-input-starting number Ns during the successive recording for the N packets as determined at step S18, the system controller 3 gives the host computer permission to supply the data and resumes the data input to the write buffer 2 at step S19. Once the number of packets stored in the write buffer 2 reaches the packet-input-stopping number Ne during the successive recording, the system controller 3 inhibits the data input to the write buffer 2 at step S21. In the case where the data supply from the host computer has already been terminated during the successive recording as determined at step S22, the system controller 3 maintains the input-stopped condition at step S23. When the data supply from the host computer is terminated after the resumption of the data input as determined at step S22, the system controller 3 stops the data input to the write buffer 2 and thereafter maintains the input-stopped condition at step S23.

As a result of the data input resumption, unrecorded data of M (which is an optional integral number of one or more)

packet may be found left in the write buffer 2 at a time point when the number of to-be-successively-recorded packets N reaches zero. In such a case, although the recording operation may be temporaily stopped, the system controller 3 in the present embodiment continues the recording operation so that the recording time can be further reduced. Namely, once the number of to-be-successively-recorded packets N reaches zero (N=0) as determined at step S16, it is ascertained at step S24 whether the current count PC of the counter 4 is zero. If answered in the negative (PC≠0) at step S24, the system controller 3 renews the number N to equal the current count PC (=M) of the counter 4 at step S25, so as to go on with the successive recording. Once both the number N and the current count PC reach zero as determined at steps S16 and S24, the system controller 3 terminates the recording operation.

Figure 2:
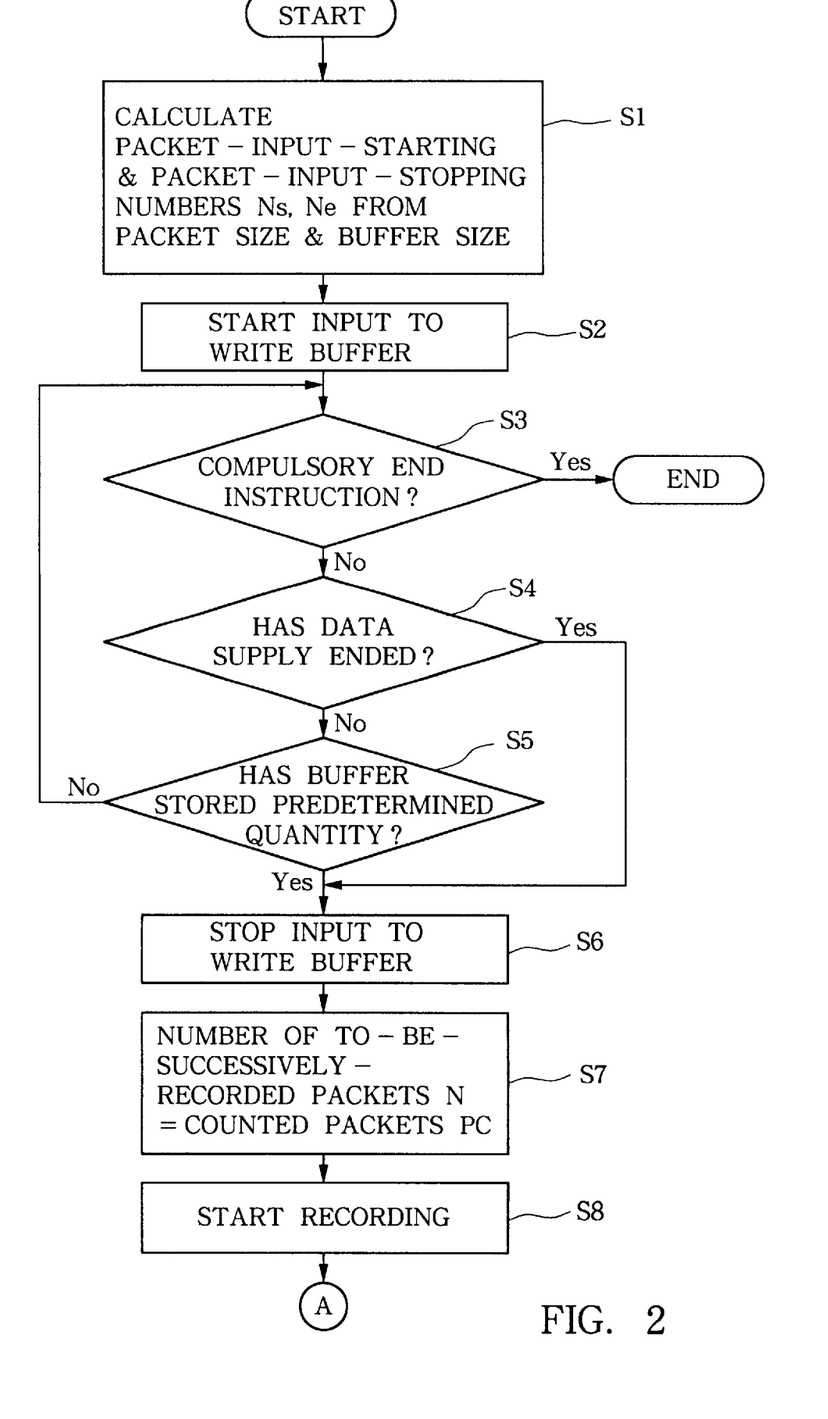
FIG. 2 is a part of a flowchart showing typical behaviour of a system controller of FIG. 1 during packet writing in the preferred embodiment.

According to the above-described successive packet writing scheme, all data to be recorded can be stored into the write buffer 2 with sufficient room to spare, through the initial data input at step S2 of FIG. 2, as long as the size of the file to be recorded is smaller than the packet-input-stopping number Ne. This allows all the data to be completely recorded with only one seek operation.

If the size of the file to be recorded is greater than the packet-input-stopping number Ne, the number of the seek operation is determined in consideration of a good balace between the rate of the data transfer from the host computer and the data recording rate. While the data recording rate in the CD-R drive device is normally fixed at, for example, 150, 300 or 600 Kbps, the rate of the data transfer from the host computer to the CD-R drive device varies depending on the host computer.

Figure 4A:
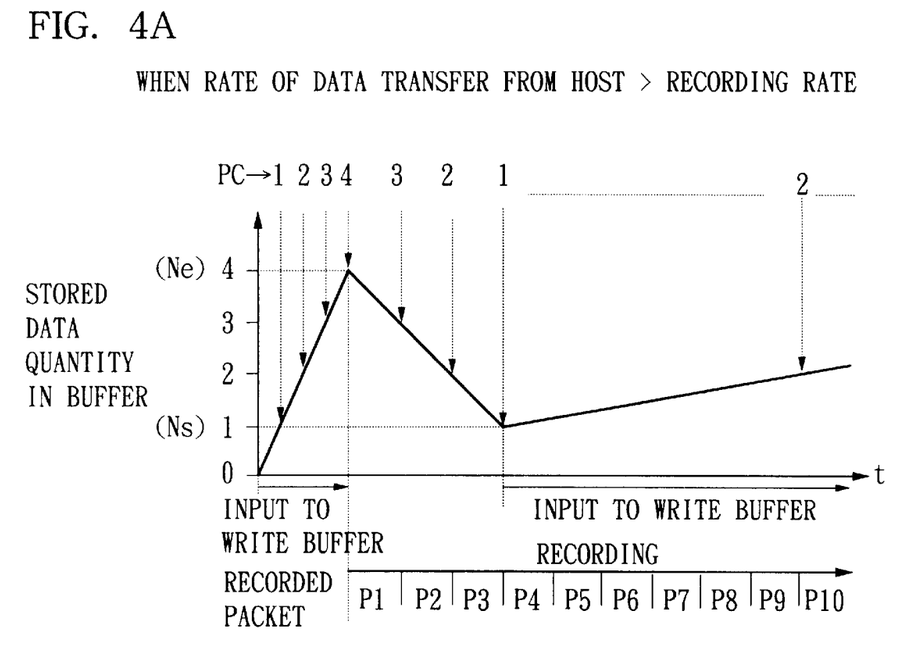
FIG. 4A is a graph showing variations of stored data quantity in a write buffer when the rate of data transfer from a host computer is higher than the data recording rate in the CD-R drive device.
Figure 4B:
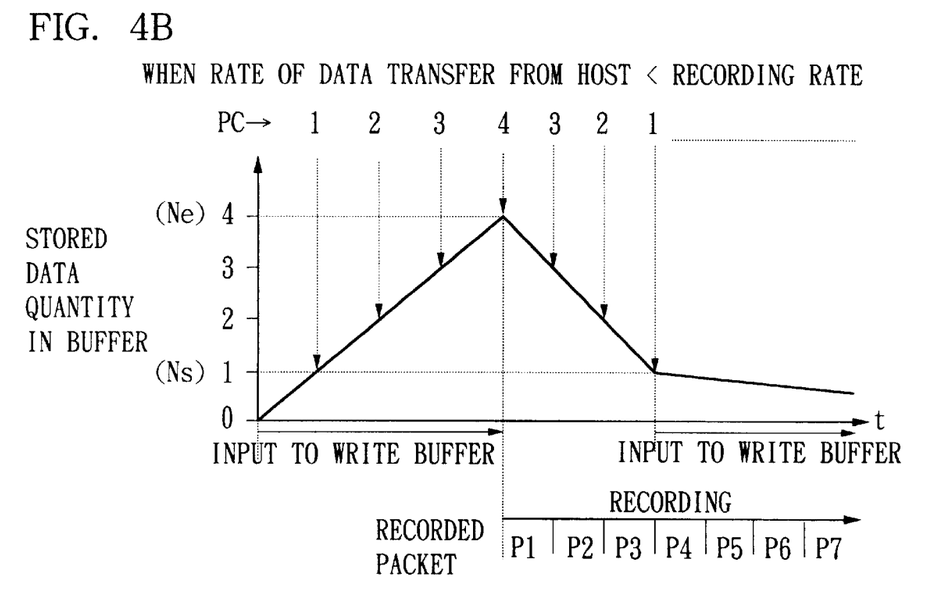
FIG. 4B is a graph showing variations of stored data quantity in the write buffer when the rate of data transfer from the host computer is lower than the data recording rate in the CD-R drive device.

FIG. 4A is a graph showing variations of stored data quantity in the write buffer 2 when the rate of the data transfer from the host computer is higher than the data recording rate in the CD-R drive device, and FIG. 4B is a graph showing variations of stored data quantity in the write buffer 2 when the rate of the data transfer from the host computer is lower than the data recording rate in the CD-R drive device. In the examples of FIGS. 4A and 4B, the packet size is set at 64 Kbytes, the storage capacity of the write buffer 2 at 256 Kbytes, the packet-input-starting number Ns at 1, the packet-input-stopping number Ne at 4, and the number of to-be-successively-recorded packets N at 4.

In the case of FIG. 4A where the rate of the data transfer from the host computer is higher than the data recording rate in the CD-R drive device, the host computer is placed in a standby state at a time point when data of four packets from the host computer have been stored into the write buffer 2, and the recording operation is started. Once recording of the data of first three packets P1, P2 and P3 is completed, the data input to the write buffer 2 is resumed. Then, the data transfer rate higher than the recording rate causes the stored data quantity in the write buffer 2 to progressively increase, and the host computer is again placed in the standby state at a time point when the stored data quantity reaches the packet-input-stopping number Ne. Now that the number of to-be-successively-recorded packets N is sequentially updated during that time, so that data of packets P4, P5, P6, . . . , are recorded in a successive manner. Thus, regardless of the file size, all data can be completely recorded with only one seek operation.

By contrast, in the case of FIG. 4B where the rate of the data transfer from the host computer is lower than the data recording rate in the CD-R drive device, the stored data quantity in the write buffer 2 progressively decreases to zero after recording of the data of first three packets P1, P2 and P3 is completed and the data input to the write buffer 2 is resumed. During that time, the recording operation is continued. However, if the file size is so great that the necessary recording operation can not be completed before the stored data quantity becomes zero, then the recording operation is temporarily stopped before all the data are completely recorded. As a result, the seek operation would take place a plurality of times during recording of all the data; however, the necessary number of the seek operations in the preferred embodiment can be far less than in the conventional packet-by-packet recording scheme.

In summary, the present invention is characterized in that once a predetermined quantity of data have been stored in a data buffer having a storage capacity for a plurality of packets of data, the stored data for predetermined N packets are sequentially read out to be successively recorded onto an optical disk. This characteristic arrangement requires only one seek operation for recording the N packets of data, thereby greatly reducing the necessary recording time and the necessary number of laser power calibration as compared to the conventional technique.

What is claimed is:

1. An optical disc recording device comprising:
 a data buffer for storing therein data of a plurality of packets supplied from an optional external source on a packet-by-packet basis, each of the packets having a predetermined data length;
 a control section that when a predetermined quantity of data have been stored in said data buffer, successively reads out from said data buffer that data for N packets from among the supplied packets, said N being an integral number of at least two;
 an encoding section that converts, into a recording format of an optical disc, the data for the N packets successively read out from said data buffer and outputs the converted data after adding thereto packet-linking information; and
 a writing section that successively records, onto the optical disc, the converted data for the N packets outputted from said encoding section, without performing a seek function between recordings of the data of each of the N packets.

2. An optical disc recording device as defined in claim 1 wherein said control section determines a maximum number of packets storable in said data buffer on the basis of a size of the supplied packets and a storage capacity of said data buffer and sets the determined number of packets as said N packets to be successively read out from said data buffer.

3. An optical disc recording device as defined in claim 1 wherein when data supply to said data buffer is terminated before the predetermined quantity of data are stored in said data buffer, said control section starts reading out the stored data from said data buffer and ends recording onto the disc after all the stored data are read out and recorded onto the optical disc.

4. An optical disc recording device as defined in claim 1 wherein if a user enters a recording ending instruction before the predetermined quantity of data are stored in said data buffer, said control section immediately ends the recording without starting reading out the stored data from said data buffer.

5. An optical disc recording device as defined in claim 1 wherein said control section starts reading out the data for the N packets from said data buffer when data for at least the N packets have been stored in said data buffer.

6. An optical disc recording device as defined in claim 1 wherein said control section inhibits the data supply from the external source at a time point when the data for Ne packets have been stored in said data buffer, said Ne being an integral number of at least two, and wherein said control section resumes the data supply from the external source when the stored data in said data buffer have decreased to a predetermined quantity of packets equal to Ns, said Ns being an integral number smaller than said Ne.

7. An optical disc recording device as defined in claim 1 wherein if data for a M packet have already been stored in said data buffer as data to be recorded following the N packets before recording of the data for the N packets is completed, said control section sets a specific number of packets to be successively recorded to M, said M being an integral number of at least one.

* * * * *